Figure 1:
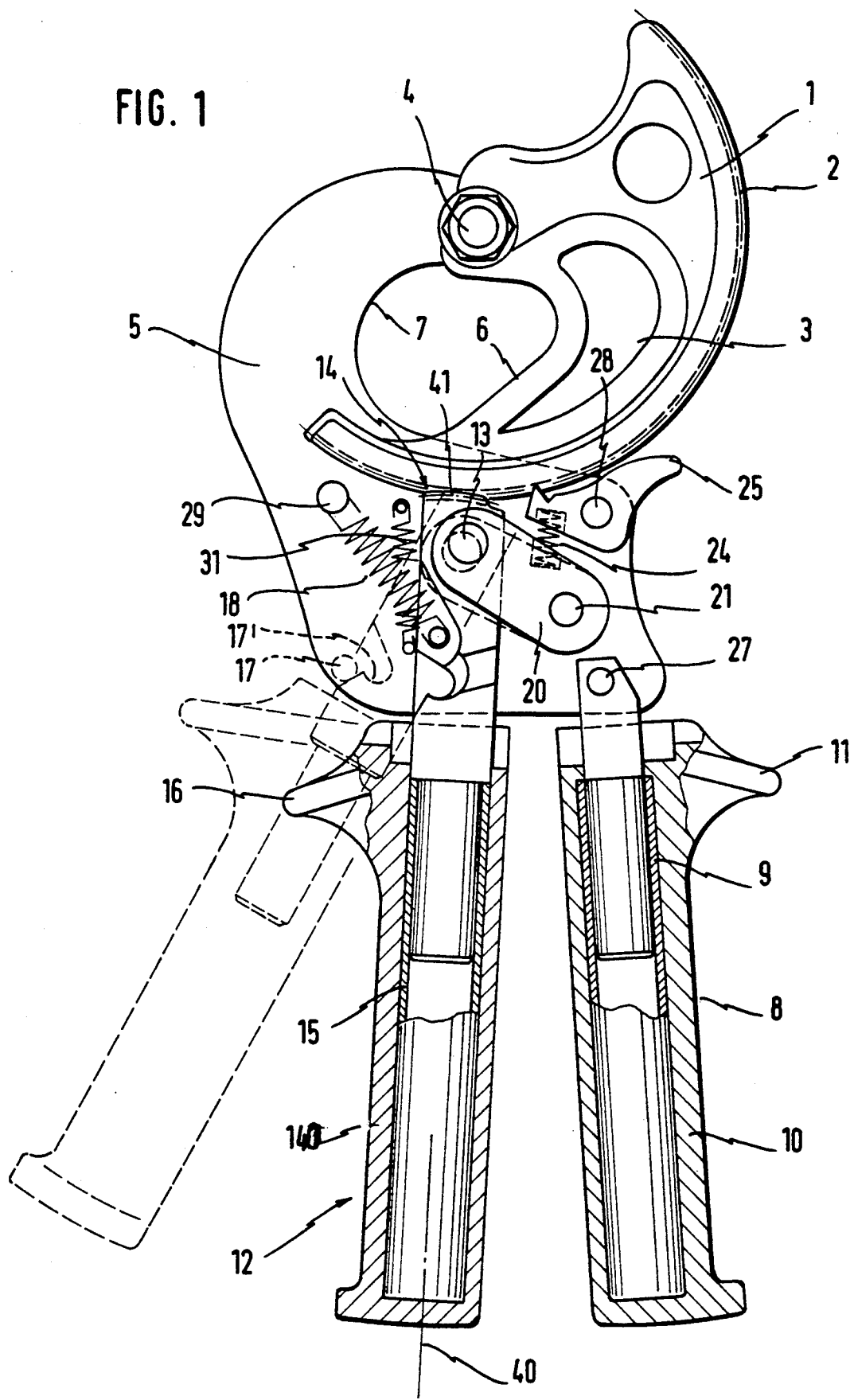

United States Patent [19]

Laux

[11] Patent Number: 5,231,763
[45] Date of Patent: Aug. 3, 1993

[54] MECHANICAL FORCE TRANSMISSION FOR A HAND TOOL

[76] Inventor: Friedrich-Günther Laux, D-1000 Berlin 39, Königsweg 304, Fed. Rep. of Germany

[21] Appl. No.: 861,478

[22] Filed: Apr. 1, 1992

[30] Foreign Application Priority Data

Apr. 5, 1991 [DE] Fed. Rep. of Germany ....... 4111086

[51] Int. Cl.⁵ .............................................. B26B 17/02
[52] U.S. Cl. ....................................... 30/250; 30/188; 30/251; 81/314
[58] Field of Search ....................... 30/250, 188, 120.4, 30/190, 189, 90.1, 92, 251; 81/314; 74/142, 151, 152

[56] References Cited

U.S. PATENT DOCUMENTS

| | | | |
|---|---|---|---|
| 1,915,404 | 6/1933 | Clifton | 30/188 |
| 4,062,218 | 12/1977 | Wiener | 81/314 |
| 4,178,682 | 12/1979 | Sadauskas | 30/250 |
| 4,312,127 | 1/1982 | Tanaka | 30/250 |
| 4,599,795 | 7/1986 | Yokoyama | 30/188 |
| 4,644,650 | 2/1987 | Laux et al. | 30/250 |

FOREIGN PATENT DOCUMENTS

| | | |
|---|---|---|
| 0186222 | 7/1986 | European Pat. Off. . |
| 2559656 | 6/1977 | Fed. Rep. of Germany . |
| 3224989 | 1/1984 | Fed. Rep. of Germany . |
| 2025825 | 1/1980 | United Kingdom ............... 30/250 |

*Primary Examiner*—Douglas D. Watts
*Assistant Examiner*—Hwei-Siu Payer
*Attorney, Agent, or Firm*—Palmatier, Sjoquist & Helget

[57] ABSTRACT

Mechanical force transmission for a hand tool having a pivot lever or the like which is adapted to be brought into engagement intermittently with a tool member to be driven and acting on a rod-like or tubular workpiece and a handle connected to the other tool member, the pivot lever being connected at one end via a joint to a rocker and on pivoting engaging with its end face arranged at the end indirectly or directly on the tool member to be driven.

11 Claims, 4 Drawing Sheets

FIG. 6  FIG. 7
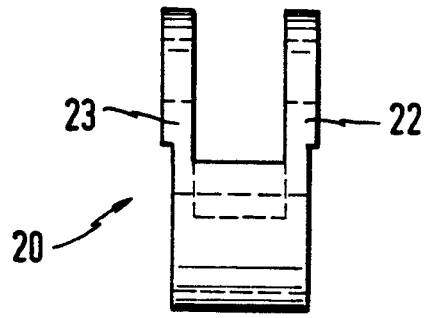
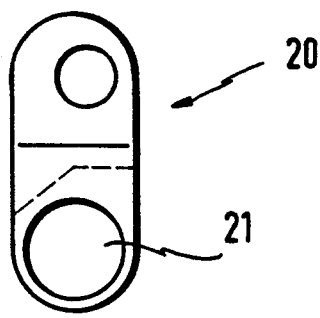
FIG. 8
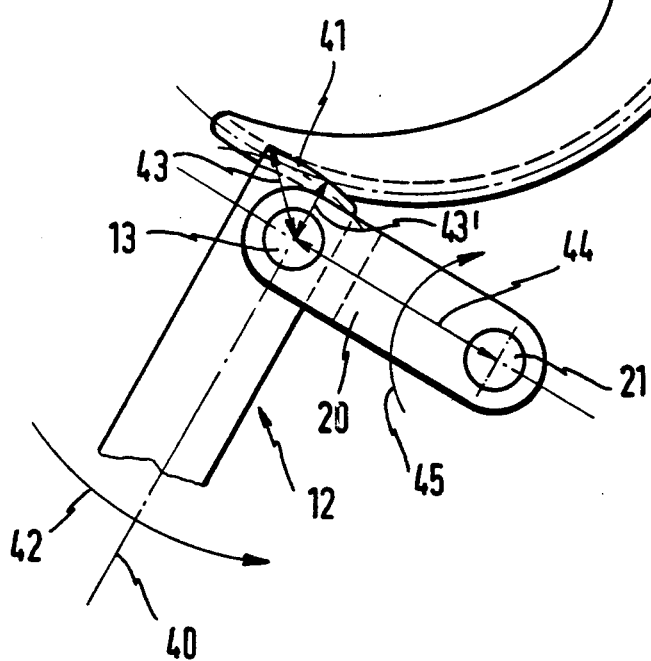
FIG. 9

MECHANICAL FORCE TRANSMISSION FOR A HAND TOOL

The invention relates to a mechanical force transmission for a hand tool having a pivot lever or the like which is adapted to be brought into engagement intermittently with a tool member to be driven and acting on a rod-like or tubular workpiece and a handle connected to the other tool member.

EP-PS 186,222 discloses the use of such a force transmission in a cable cutting appliance. A tool member formed as toothed rotary blade is set intermittently into motion with a feed pawl; the feed pawl is connected via an eccentrically mounted pivot pin to the pivot lever. The smaller the eccentricity between the geometrical centres of the cylindrical pivot pin and the cylindrical block surrounding the latter the greater the feed forces which are transmitted via the feed pawl to the toothing meshing therewith on the rotary blade.

The construction of this force transmission is relatively complicated. The invention is based on the problem of providing a force transmission of the type mentioned at the beginning with the lowest possible costs and with a relatively low weight which can be used in "one-hand operation" under spatially restricted conditions.

This problem is solved in that according to the invention the pivot lever or the like is connected at one end via a joint or the like to a rocker or the like and on pivoting engages with its end face disposed at the end directly or indirectly on the tool member to be driven.

The particularly simple construction of the transmission and the components cooperating therewith leads to the creation of a hand implement having a total length for example of about 25 cm which, as already observed, can be operated in "one-hand mode" as well.

According to a particularly preferred embodiment of the invention the centre of curvature of the end face is arranged eccentrically with respect to the centre axis of the pivot lever or the like and possibly the centre point of the joint of the pivot lever or the like. This arrangement provided to generate large cutting or pressing forces will be described in detail below. The pivot lever or the like can be adapted to be brought into the operative position against the pressure of at least one spring, preferably a tension spring. This position of the pivot lever necessary as starting position for the repeated actuation thereof can of course also be assisted with other suitable means.

Expediently, the rocker or crank or the like is constructed in U-form and carries the pivot lever or the like between the free ends of its legs; the pivot lever may be constructed as thrust element.

According to an expedient embodiment the pivot lever or the like is provided with a detent means for a freewheel position; also, the pivot lever can be provided with a stop for the engagement position.

A configuration of the invention has been found particularly expedient in which all the components of the force transmission and of the movable member are arranged between two plates, one of which is removable; it is also possible here to arrange all the components of the force transmission on one side of a support plate.

According to a preferred embodiment of the invention the web of the U-shaped rocker, crank or the like is held rotatably on a spacer pin between the support plate and the cover plate. The pivot lever or the like and the movable tool member may also be provided with respective teeth which are adapted to be brought into engagement with each other. Furthermore, a resiliently mounted holding pawl or the like may be provided for the movable tool member.

Preferably, a rotatable lock pin or the like having a projection pointing in the direction of the pivot lever or the like is adapted to engage optionally on the pivot lever or the like for locking in the rest position; it is also possible to provide at least one intermediate element between the pivot lever and the tool member to be driven.

As already mentioned above, use of the invention in a cable cutter is particularly expedient; in this case the movable tool member can be constructed as rotary blade.

Finally, it is also possible for the pivot lever to be provided in the grip region with voltage-insulating possibly multilayer shaped grips.

In the drawings an example of embodiment of the invention is illustrated and will be explained in detail below.

Figures 2, 3:
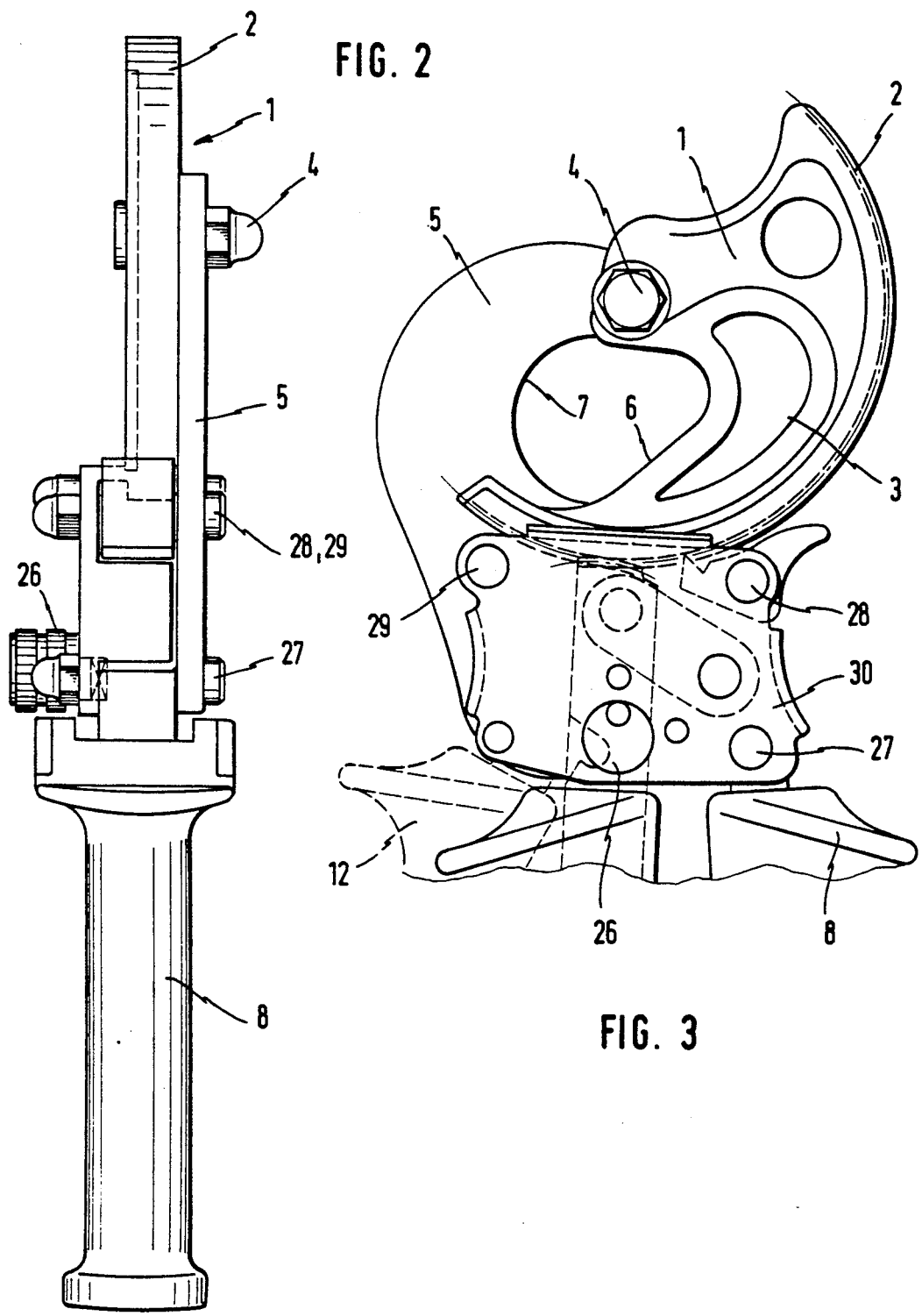
Figure 4:
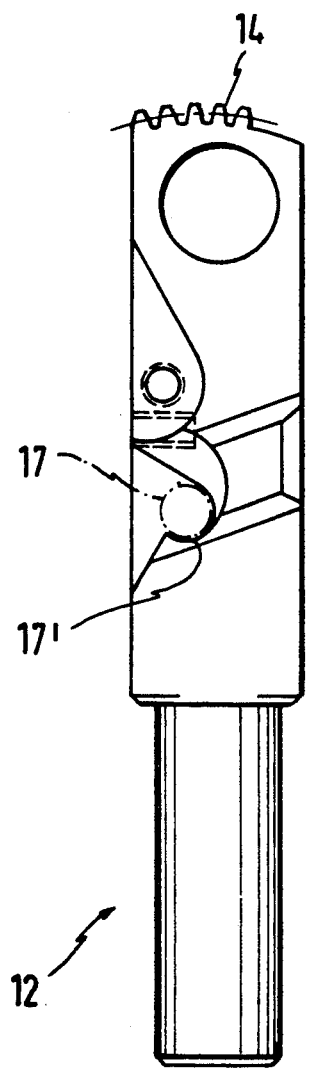
Figure 5:
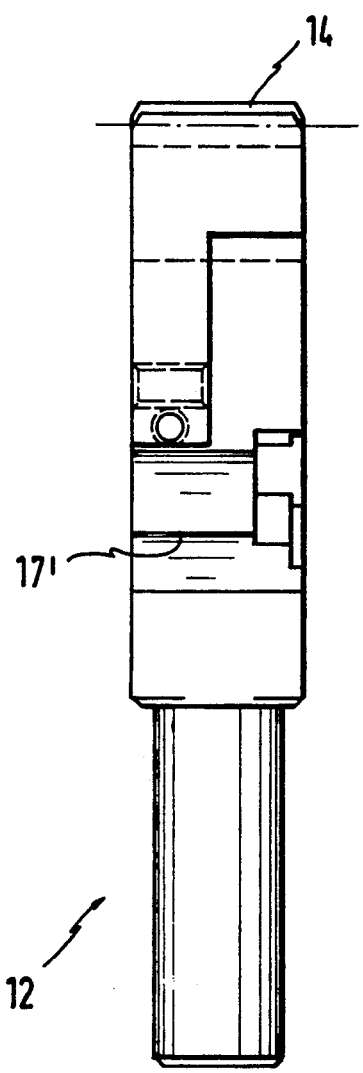

In the drawings:

FIG. 1 shows a plan view of an embodiment of the invention in which the cover plate is omitted, FIG. 2 shows a side view of the same embodiment, FIG. 3 shows the upper portion of the embodiment illustrated in FIG. 1 in plan view but with the cover member, FIG. 4 shows a detail of the embodiment according to FIGS. 1 to 3 to a larger scale, FIG. 5 shows the detail illustrated in FIG. 4 seen from the side, FIG. 6 shows a further detail of the embodiment illustrated in FIG. 1, FIG. 7 shows a side view of the detail illustrated in FIG. 6, FIG. 8 is a functional sketch and FIG. 9 shows a further detail of the embodiment according to FIG. 1 in side view.

The example of embodiment illustrated in FIG. 1 of the use of the force transmission according to the invention shows a cable cutter having a rotary blade 1 which comprises a toothing 2 extending approximately in semicircular form and a cutout 3. The rotary blade 1 rotatable about a pivot pin 4 cooperates with an immovable tool member 5 constructed as support plate. At the inner side of the rotary blade 1 a cutting edge 6 may be provided; a corresponding cutting edge 7 may also be disposed at the inner side of the fixed tool member 5.

A handle 8 is immovably secured to the tool member 5 constructed as support plate; a support sleeve 9 is surrounded by a voltage-insulating possibly multilayer shaped grip 10 and comprises a thumb rest 11.

A pivot lever 12 which can be turned about a pivot 13 is arranged pivotally with respect to the support plate or tool member 5 and the handle 8. The end side 14 of the pivot lever is provided with a toothing adapted to be brought into engagement intermittently with the toothing 2 of the rotary blade.

At its free end, i.e. in the grip region, the pivot lever comprises a voltage-insulating possibly multilayer shaped grip 140 which is adapted to be pushed onto a sleeve 15 which will be described below and comprises a thumb rest 16.

The pivot lever 12 is also illustrated in a dashed position of its starting location, i.e. in a position in which an engagement of the toothing 14 with the toothing 2 takes place, as will be described in detail below.

Before this engagement the detent lever is to be released from its (unengaging) locking at the detent pin 17.

A tension spring 18 pulls the pivot lever into the starting position out of which it can be pivoted by actuation in the direction towards the handle 8. The joint connection of the pivot lever is only with a rocker 20 which in turn is pivotal about a pivot 21 and has two legs 22, 23 between which the pivot lever is held by the pivot pin 13.

A holding pawl 25 is adapted to engage in the teeth 2 of the rotary blade against the pressure of a spring 24. This engagement takes place every time a pivot movement of the pivot lever is executed in the direction towards the handle, as shown in full lines, so that the rotary blade cannot turn back anticlockwise.

A blocking member 26 engages in this position of the pivot lever and the knurling is turned so that the pivot lever cannot itself leave the position shown in full lines in FIG. 1.

As apparent from FIG. 3, the moving parts just described, which are all arranged on one side of the support plate or tool member 5, are covered by a cover plate 30 from which apart from the blocking member 26 only the holding screws 27, 28 and 29 project; the screw 29 serves as abutment for the tension spring 18; the screw 28 forms the pivot of the holding pawl 25 and the screw 27 is the mounting screw for the handle 8.

It should also be pointed out that a second tension spring 31 is provided which brings the pivot lever 12 into engagement with the toothing 2 of the rotary blade.

As apparent in particular from FIG. 8 the pivot pin 13 of the pivot lever 12 is mounted eccentrically, that is eccentrically with respect to the centre axis of the pivot lever and the teeth 41 provided at the end face of the pivot lever with centre axis 40. The rocker 20 is rotatably mounted on a pivot pin 21 between the support plate and the cover plate; said pivot pin can consist as indicated in FIG. 1 of a cylindrical pin with a round bearing surface.

On rotation of the pivot lever 12 in the direction of the arrow 42 the outer toothing of the pivot lever starts to roll along the toothing 2 of the rotary blade 1 and at the same time to generate an advance corresponding to the extension of the lever lengths 43, 44. The lever length 43 is indicated by the corresponding arrow in FIG. 8 and corresponds to the distance between the centre of rotation of the pivot 13 and the tooth meshing. The lever length 44 is equal to the spacing of the centre points of the two pivots 13 and 21. After the rotation of the pivot lever 12 the spacing between the pivot centre point 13 and toothing is indicated at 43'.

Whereas with the extension of the "toggle lever" formed by 43 and 44 the feed travel approaches zero, the feed component performed by the toothing increases from almost zero during the initial rolling to the transmission value with the variable lever lengths 43 to 43' at the drive and 44 at the rotary blade, gear or the like.

The total profile of the desired feed can be made more or less linear in accordance with the configuration and thus adapted to particular requirements in the pressing or cutting operations.

The pivot point of the rocker 20 should be defined so that by the rotary force at the pivot lever 12 are resultant an engagement force is effective on the rocker in the direction of the arrow 45 so that the tooth meshing of the pivot lever 12 does not disengage under load.

After reaching the position of the pivot lever 12 shown in full lines in FIG. 1 the pivot lever 12 can either be arrested with the blocking member 26 or pivoted back into the position shown in dashed lines in FIG. 1. The holding pawl 25 prevents the rotary blade 1 from returning. When the pivot lever 12 has been pivoted back the rocker 20 disengages from the stationary rotary blade toothing.

In the rest position or pivoted-out position of the pivot lever 12, i.e. when the detent pin 17 engages into the detent opening 17', the holding pawl 25 can be disengaged so that the rotary blade or the tool member 1 can be turned into any desired position.

I claim:

1. A hand tool apparatus for mechanical force transmission between two tool members, comprising a first tool member having a handle fixedly attached thereto; a second tool member pivotally attached to said first tool member and having an outer engagement force thereon; a rocker arm pivotally attached to said first tool member at one of its ends and having a distal end pivot mounting means; and a pivot lever having a pivotal connection pivotally connected to said distal end pivot mounting means, said pivot lever having a surface about an end proximate to said rocker arm distal end pivot mounting means; whereby said pivot lever surface is engageable with said second tool member engagement face when said pivot lever is pivoted about said pivot mounting means.

2. The apparatus of claim 1, wherein said pivot lever surface is arcuate and comprises a plurality of teeth, and said second tool member engagement face further comprises a plurality of teeth and is rounded.

3. The apparatus of claim 2, wherein said pivot lever further comprises a longitudinal axis and said pivot lever teeth are arcuately arranged from a radius extending from said longitudinal axis, said pivot lever pivotal connection being eccentrically offset from said longitudinal axis.

4. The apparatus of claim 2, wherein said pivot lever further comprises a longitudinal axis and said pivot lever teeth are arcuately arranged from a radius extending from said longitudinal axis, said pivot lever pivotal connection being aligned along said longitudinal axis.

5. The apparatus of claim 2, further comprising a detent means for setting said pivot lever at a position disengaging said pivot lever teeth from said second tool member teeth, said detent means including a pin on said first tool member and a detent opening on said pivot lever.

6. The apparatus of claim 2, further comprising a locking pawl pivotally mounted to said first tool member, having means for engaging said second tool member teeth.

7. The apparatus of claim 1, further comprising a spring means for urging said pivot lever pivotally away from said handle, said spring means connected between said pivot lever and said first tool member.

8. The apparatus of claim 1, wherein said rocker arm further comprises a U-shaped arm having two legs at its distal end to form said distal end pivot mounting means, and said pivot lever is connected between said legs.

9. The apparatus of claim 1, further comprising a stop means on said first tool member for limiting the pivotal movement of said pivot lever.

10. The apparatus of claim 1, further comprising a single plate mounted on one side of said apparatus, and supporting said first and second tool members, said pivot lever and said handle.

11. The apparatus of claim 1, wherein said second tool member further comprises a blade.

* * * * *